United States Patent [19]
Ziolo

[11] Patent Number: 5,188,918
[45] Date of Patent: Feb. 23, 1993

[54] TONER AND DEVELOPER COMPOSITIONS COMPRISING FULLERENE

[75] Inventor: Ronald F. Ziolo, Webster, N.Y.

[73] Assignee: Xerox Corporation, Stamford, Conn.

[21] Appl. No.: 709,734

[22] Filed: Jun. 3, 1991

[51] Int. Cl.$^5$ ............................................. G03G 9/09
[52] U.S. Cl. .................................... 430/106; 430/109; 430/110
[58] Field of Search ......................... 430/106, 110, 109

[56] References Cited

U.S. PATENT DOCUMENTS

| | | | |
|---|---|---|---|
| 3,590,000 | 6/1971 | Palermiti et al. | 252/62.1 |
| 4,514,485 | 4/1985 | Ushiyama et al. | 430/106.6 |
| 4,560,635 | 12/1985 | Hoffend et al. | 430/106.6 |
| 4,828,954 | 5/1989 | Hashimoto et al. | 430/110 |
| 4,935,326 | 6/1990 | Creatura et al. | 430/108 |
| 4,937,166 | 6/1990 | Creatura et al. | 430/108 |
| 4,990,427 | 2/1991 | Kohri et al. | 430/110 |

OTHER PUBLICATIONS

Nash, J. M.; "Great Balls of Carbon", Time Magazine, May 6, 1991, p. 66.
Science "Buckyballs, Hairyballs, Dopeyballs", vol. 252, Apr. 12, 1991, p. 646.
Nature, "Solid $C_{60}$:A New Form of Carbon", W. Krätschmer et al., vol. 347, Sep. 27, 1990, pp. 354 to 358.
Chemical & Engineering News, "Simple Synthesis of $C_{60}$ Molecule Triggers Intense Research Effort", R. M. Baum, Oct. 29, 1990, pp. 22 to 25.

Primary Examiner—Roalnd Martin
Assistant Examiner—Rosemary Ashton
Attorney, Agent, or Firm—E. O. Palazzo

[57] ABSTRACT

A toner composition comprised of resin particles and pigment particles comprised of a fullerene or fullerenes.

18 Claims, No Drawings

TONER AND DEVELOPER COMPOSITIONS COMPRISING FULLERENE

BACKGROUND OF THE INVENTION

This invention is generally directed to toner and developer compositions, and more specifically the present invention is directed to toner compositions, including magnetic, single component, and colored toner compositions comprised of a new third form of carbon. In one embodiment of the present invention, the toner compositions are comprised of resin particles, and pigment particles comprised of any one of the fullerenes, such as buckminsterfullerene, giant fullerenes or mixtures thereof. There are also provided in accordance with the present invention toner compositions comprised of resin particles, pigment particles comprised of buckminsterfullerene, any one of the fullerenes, giant fullerenes or mixtures thereof, and charge enhancing additives. Furthermore, there is provided in accordance with the present invention toner compositions wherein the buckminsterfullerene or fullerenes can be present as external or internal additives. In addition, the present invention is directed to developer compositions comprised of the aforementioned toners and carrier particles. Furthermore, in another embodiment of the present invention there are provided single component toner compositions comprised of resin particles, magnetic components such as magnetites, and pigment particles comprised of buckminsterfullerene, any one of the fullerenes, giant fullerenes, high molecular weigh fullerenes, or mixtures thereof. The toner and developer compositions of the present invention are useful in electrostatographic imaging systems, especially xerographic imaging and printing processes.

Molecular fullerenes have been described as entirely closed, hollow spheroidal shells of carbon atoms containing 32 to 1,000 or more carbon atoms in each sphere, reference Smalley, R. E. "Supersonic Carbon Cluster Beams in Atomic and Molecular Clusters", Bernstein, E. R., Ed.; *Physical and Theoretical Chemistry*, Vol. 68, Elsevier Science: New York, 1990; pages 1 to 68, the disclosure of which is totally incorporated herein by reference. The prototypical fullerene, $C_{60}$, has been referred to as buckminsterfullerene and has the molecular geometry of a truncated icosahedron, thus the $C_{60}$ molecules resemble a molecular sized soccer ball, reference *Time Magazine*, May 6, 1991, page 66, and *Science*, vol. 252, Apr. 12, 1991, page 646, the disclosure of which is totally incorporated herein by reference. Molecules of $C_{60}$ as well as of $C_{70}$ and of other fullerenes have also been referred to as buckyballs. Buckminsterfullerene usually consists of $C_{60}$ molecules contaminated with small amounts of $C_{70}$ and possibly $C_{84}$ molecules or even smaller amounts of higher molecular weight fullerene molecules. The preparation of buckminsterfullerene and of other fullerenes from the contact arc vaporization of graphite and a number of the buckminsterfullerene characteristics such as solubility, crystallinity, color and the like, have been described in Kratschmer, W., Lamb, L. D., Fostiropoulos, K., Huffman, D. R., *Nature*, 1990, Vol. 347, pages 354 to 358 and in *Chemical and Engineering News*, Oct. 29, 1990, pages 22 to 25, the disclosures of which are totally incorporated herein by reference. The fullerenes are available from Texas Fullerenes Corporation, 2415 Shakespeare Suite 5, Houston, Tex. 77030-1038, Materials & Electrochemical Research (MER) Corporation, 7960 South Kolb Road, Tucson, Ariz. 85706, and Research Materials, Inc., 1667 Cole Boulevard, Golden, Colo. 80401, and are believed to be comprised of mainly $C_{60}$ and smaller amounts of $C_{70}$ and $C_{84}$ carbon molecules, and possible small amounts of other higher molecular weight fullerenes. It is believed that these new forms of carbon possess a number of advantages for toners, including, for example, their solubility in organic solvents. The other known carbon forms, diamond and graphite and derivatives thereof, are not considered to be soluble in such solvents. Solubility in organic solvents enables improved processing and the economical preparation of toner compositions wherein the optical density is considered low since the fullerenes are of different colors and are of substantially lower optical density than ordinary carbon black, thereby enabling their use in colored toners with, for example, cyan, magenta, yellow, red, green, and brown toners. Moreover, the surface conductivity characteristics of derivatized fullerenes can provide for conductive toners. Also, the fullerenes may be selected as toner charge enhancing additives, especially for colored toners. Further, the fullerenes may be deposited on known surface flow additives, such as colloidal silicas like the AEROSILS®, such as AEROSIL R972®, and the resulting product selected as a charge additive for toner compositions.

Developer and toner compositions with carbon black pigments, such as REGAL 330® carbon black, are known. Also, toners and developers with certain charge enhancing additives and surface additives are known. Representative patents disclosing the aforementioned toners and developers include U.S. Pat. Nos. 3,590,000; 4,298,672; 4,560,635; 4,937,166 and 4,935,326, the disclosures of which are totally incorporated herein by reference. Also known are toners and developers with colored pigments, such as cyan, yellow, magenta, and mixtures thereof, and toners with additives such as waxes, like polypropylene, or polyethylene. Additionally, toners with surface additives such as silicas, metal salts of fatty acids, and the like are known.

More specifically, developer and toner compositions with certain waxes therein are known. For example, there are disclosed in U.K. Patent Publication 1,442,835 toner compositions containing resin particles and polyalkylene compounds, such as polyethylene and polypropylene of a molecular weight of from about 1,500 to 6,000, reference page 3, lines 97 to 119, which compositions prevent toner offsetting in electrostatic imaging processes. Additionally, the '835 publication discloses the addition of paraffin waxes together with, or without a metal salt of a fatty acid, reference page 2, lines 55 to 58. In addition, many patents disclose the use of metal salts of fatty acids for incorporation into toner compositions, such as U.S. Pat. No. 3,655,374. Also, it is known that the aforementioned toner compositions with metal salts of fatty acids can be selected for electrostatic imaging methods wherein blade cleaning of the photoreceptor is accomplished, reference Palmeriti et al. U.S. Pat. No. 3,635,704, the disclosure of which is totally incorporated herein by reference. Additionally, there are illustrated in U.S. Pat. No. 3,983,045 three component developer compositions comprising toner particles, a friction reducing material, and a finely divided nonsmearable abrasive material, reference column 4, beginning at line 31. Examples of friction reducing materials include saturated or unsaturated, substituted or unsubstituted, fatty acids preferably of from 8 to 35 carbon atoms, or metal salts of such fatty acids; fatty alcohols corresponding to said acids; mono and polyhydric alcohol esters of said acids and corresponding amides; polyethylene glycols and methoxy-polyethylene glycols; terephthalic acids; and the like, reference column 7, lines 13 to 43.

Toner and developer compositions containing charge enhancing additives, including additives which impart a positive charge to the toner resin, are well known. Thus, for example, there is described in U.S. Pat. No. 3,893,935 the use of certain quaternary ammonium salts as charge control agents for electrostatic toner compositions. There are also described in U.S. Pat. No. 2,986,521 reversal developer compositions comprised of toner resin particles coated with finely divided colloidal silica. Further, there are illustrated in U.S. Pat. No. 4,338,390, the disclosure of which is totally incorporated herein by reference, developer and toner compositions having incorporated therein as charge enhancing additives organic sulfate and sulfonate compositions; and in U.S. Pat. No. 4,298,672, the disclosure of which is totally incorporated herein by reference, positively charged toner compositions containing resin particles and pigment particles, and as a charge enhancing additive alkyl pyridinium compounds, inclusive of cetyl pyridinium chloride.

Other prior art disclosing positively charged toner compositions with charge enhancing additives include U.S. Pat. Nos. 3,944,493; 4,007,293; 4,079,014 and 4,394,430. Toners with aluminum complex charge additives are illustrated in U.S. Pat. No. 4,845,003. The disclosure of each of the United States patents is totally incorporated herein by reference.

SUMMARY OF THE INVENTION

It is a feature of the present invention to provide toner and developer compositions which possess many of the advantages illustrated herein.

Another feature of the present invention resides in the provision of toner and developer compositions with stable triboelectrical characteristics for extended time periods.

In another feature of the present invention there are provided toner compositions comprised of a third form of carbon, referred to as a fullerene, a form of $C_{60}$ carbon, or a mixture of $C_{60}$ with other fullerenes.

Moreover, another feature of the present invention relates to the provision of colored toner and developer compositions.

Furthermore, another feature of the present invention resides in the provision of positively charged, or negatively charged toner and developer compositions useful for the development of images present on positively or negatively charged imaging members.

Additionally, in yet another feature of the present invention there are provided toner and developer compositions with certain waxes therein or thereon that enable images of excellent quality inclusive of acceptable resolutions.

In another feature of the present invention there are provided toner compositions with fullerenes therein or thereon which are useful for causing the development of electrostatic latent images, including color images.

Further, in another feature of the present invention there are provided substantially colorless toner compositions with solid fullerene pigments.

Moreover, in another feature of the present invention there are provided toner compositions with high molecular weight fullerenes, such as $C_{234}$, $C_{340}$, or mixtures thereof.

Further, in another feature of the present invention there are provided toner compositions, and the like, such as charge additives comprised of polymerized fullerenes, or oligomerized fullerenes.

Another feature of the present invention resides in the provision of toners with derivatized fullerenes containing various groups, such as alkyls, of for example from 1 to about 25 carbon atoms, like methyl, ethyl, propyl, butyl, pentyl, heptyl, hexyl, and the like; aryls with, for example, from 6 to about 24 carbon atoms like phenyl, naphthyl, and the like; ethylene diamine; hydroxy; carboxy; carbonyl; amino; amido; osmylato; oxo dioxo; keto; mercapto; alkoxy, such as methoxy, and the like; imino; allyl; ethynyl; azo; nitroso; formyl; halo, such as chloro; cyano, carboxamido; alkoxycarbonyl; nitro; vinyl; peroxy; and the like, which groups can be appended via chemical bonding to the fullerene cage, reference for example *The Journal of Organic Chemistry*, 1990, Volume 55, pages 6250 to 6252, the disclosure of this article being totally incorporated herein by reference. These fullerenes thus could contain chemical groups that can function as dyes, surfactants, lubricants, hydrophobic segments, hydrophilic segments, and the like, to for example enhance toner performance, such as flow, moisture resistance, and the like. Furthermore, toners, and the like with fullerenes that contain noncarbon atoms in the cage are envisioned. These fullerenes can be derived from an all carbon fullerene wherein, one, two, three, four, or more carbon atoms comprising the framework are replaced with known noncarbon atoms, such as boron. Also, fullerenes with an atom, or atoms, other than carbon inside the cage, such as any atom, or atoms, of the known Periodic Table, such as calcium, sodium, potassium, silicon, copper, selenium, lanthanum, chlorine, iron, and the like, the disclosure of which is totally incorporated herein by reference, can be trapped inside the spheroidal cluster of carbon atoms.

In yet another feature of the present invention there are provided toners and the like, such as charge additives with derivatized, substituted, filled, or pristine fullerenes.

It is still another feature of the present invention to provide toners with fullerenes, or a fullerene with a molecular weight of from about 384 to about 12,000.

These and other features of the present invention can be accomplished by providing developer compositions and toner compositions comprised of resin particles, and pigment particles comprised of fullerenes, a new third form of carbon also referred to as buckminsterfullerene or buckyballs, other forms of fullerenes illustrated herein, and other known fullerenes. More specifically, the present invention is directed to toner compositions comprised of resin particles, and pigment particles comprised of fullerenes, a third form of carbon, described as being comprised of 60 atom clusters of carbon arranged at the verticies of a truncated icosahedron and resembling miniature soccer balls. Such a structure resembles the geodesic domes designed by R. Buckminister Fuller, Jr., the namesake of these molecular structures. In one embodiment of the present invention, there are provided toner compositions comprised of resin particles, pigment particles, and fullerenes as charge additives. Also, in another embodiment of the present invention there are provided colored toner compositions comprised of known toner resin particles, fullerene pigment particles, and pigment particles comprised of cyan, magenta, yellow, red, green, blue, brown, or mixtures thereof. Furthermore, there are provided in accordance with the present invention positively charged toner compositions comprised of resin particles, fullerene pigment particles, polymeric alcohol waxes, and charge enhancing additives. Another embodiment of the present invention is directed to developer compositions comprised of the aforementioned toners and carrier particles. Reference to fullerenes includes all forms of the fullerenes illustrated herein, other known fullerenes, mixtures thereof in embodiments, and the like.

In addition, in accordance with embodiments of the present invention there are provided developer compositions comprised of toner compositions containing resin particles, particularly styrene butadiene resins, fullerene pigment particles, polymeric hydroxy waxes available from Petrolite, which waxes can be incorporated into the toner compositions as internal additives or may be present as external components; and optional charge enhancing additives, particularly for example distearyl dimethyl ammonium methyl sulfate, reference U.S. Pat. No. 4,560,635, the disclosure of which is totally incorporated herein by reference, and carrier particles. As carrier components for the aforementioned compositions, there can be selected steel or ferrite materials, particularly with a polymeric coating thereover including fluoropolymers, terpolymers of styrene, methacrylate, and an organo silane, polymethylmethacrylate, mixtures of polymers, and the like, reference for example U.S. Pat. Nos. 3,590,000; 3,526,533; 3,849,182; 4,040,969; 4,937,166 and 4,935,326, the disclosures of which are each totally incorporated herein by reference. Developer compositions comprised of carrier particles and a toner composition comprised of fullerenes, or a fullerene are also envisioned by the present invention in embodiments thereof.

Illustrative examples of suitable known toner resins selected for the toner and developer compositions of the present invention, and present in various effective amounts such as, for example, from about 70 percent by weight to about 98 percent by weight, include polyesters, polyamides, epoxy resins, polyurethanes, polyolefins, vinyl resins, styrene methacrylates, styrene acrylates, styrene butadienes, crosslinked styrene copolymers, and polymeric esterification products of a dicarboxylic acid and a diol comprising a diphenol, and the like. Typical vinyl resins that may be selected as the toner resin include homopolymers or copolymers of two or more vinyl monomers. Examples of vinyl monomeric units include styrene, p-chlorostyrene, vinyl naphthalene, unsaturated mono-olefins such as ethylene, propylene, butylene, isobutylene and the like; vinyl halides such as vinyl chloride, vinyl bromide, vinyl fluoride, vinyl acetate, vinyl propionate, vinyl benzoate, and vinyl butyrate; vinyl esters such as esters of monocarboxylic acids including methyl acrylate, ethyl acrylate, n-butylacrylate, isobutyl acrylate, dodecyl acrylate, n-octyl acrylate, 2-chloroethyl acrylate, phenyl acrylate, methylalpha-chloroacrylate, methyl methacrylate, ethyl methacrylate, and butyl methacrylate; acrylonitrile, methacrylonitrile, acrylamide; vinyl ethers such as vinyl methyl ether, vinyl isobutyl ether, and vinyl ethyl ether; N-vinyl indole; N-vinyl pyrrolidone; and the like. Specific examples of toner resins include styrene butadiene copolymers, especially styrene butadiene copolymers prepared by a suspension polymerization process reference, U.S. Pat. No. 4,558,108, the disclosure of which is totally incorporated herein by reference; and mixtures thereof.

As one toner resin, there can be selected the esterification products of a dicarboxylic acid and a diol comprising a diphenol, which components are illustrated in U.S. Pat. No. 3,590,000, the disclosure of which is totally incorporated herein by reference. Other specific toner resins include styrene/methacrylate, especially butyl methacrylate, copolymers, styrene/acrylate copolymers, and styrene/butadiene copolymers, especially those as illustrated in the aforementioned patent; and styrene butadiene resins with high styrene content, that is exceeding from about 80 to 85 percent by weight of styrene, which resins are available as PLIOLITES ® and PLIOTONES ® from Goodyear Chemical Company; polyester resins obtained from the reaction of bisphenol A and propylene oxide, followed by the reaction of the resulting product with fumaric acid; and branched polyester resins resulting from the reaction of dimethylterephthalate, 1,3-butanediol, 1,2-propanediol and pentaerythritol, and other known toner resins.

The pigment particles for the toners of the present invention can be comprised of fullerenes, a new form of carbon as illustrated herein, and as obtained from the sources mentioned herein. The aforementioned fullerenes are believed to be comprised mainly of $C_{60}$ but contain some $C_{70}$ carbon as well and probably small amounts of higher molecular weight fullerenes. As pigment particles the solid fullerenes are present in various effective amounts, such as for example from about 1 to about 25, and preferably from about 3 to about 15 weight percent. High molecular weight fullerenes, such as $C_{234}$, $C_{340}$, and the like may also be selected.

The pigment particles may also be comprised of a mixture, in effective amounts, of the fullerenes or a fullerene, and magnetites, including those commercially available as MAPICO BLACK ®, which can be present in the toner composition in an amount of from about 10 percent by weight to about 70 percent by weight, and preferably in an amount of from about 10 percent by weight to about 30 percent by weight. Known black pigments, in effective amounts, such as from about 2 to about 10 weight percent, such as carbon black like REGAL 330 ® carbon black, may also be included in the toners and developers of the present invention in embodiments thereof.

In embodiments of the present invention, there are provided colored toner compositions comprised of resin particles, fullerene pigment particles, and pigments or colorants such as magenta, cyan, and/or yellow particles, as well as mixtures thereof. More specifically, with regard to the generation of color images utilizing the toner and developer compositions of the present invention, illustrative examples of magenta materials that may be selected include, for example, 2,9-dimethyl-substituted quinacridone and anthraquinone dye identified in the Color Index as CI 60710, CI Dispersed Red 15, a diazo dye identified in the Color Index as CI 26050, CI Solvent Red 10, LITHOL SCARLETT ™, HOSTAPERM ™, and the like. Illustrative examples of cyan materials that may be used as pigments include copper tetra-4(octadecyl sulfonamido) phthalocyanine, X-copper phthalocyanine pigment listed in the Color Index as CI 74160, CI Pigment Blue, and Anthrathrene Blue, identified in the Color Index as CI 69810, Special Blue X-2137, SUDAN BLUE ™, and the like; while illustrative examples of yellow pigments that may be selected include diarylide yellow 3,3-dichlorobenzidene acetoacetanilides, a monazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy acetoacetanilide, Permanent Yellow FGL, and the like. The mixture of fullerene and colored pigments are generally present in the toner composition in an effective amount of, for example, from about 2 weight percent to about 20 weight percent based on the weight of the toner resin particles. Moreover, the fullerenes, in effective amounts, such as for example from about 1 to about 10, and preferably from 1 to about 5 weight percent can function as a color pigment in of themselves, for example the $C_{60}$ can be yellow in color; the $C_{70}$ can be redish brown; or the fullerenes can function as an added toner color component, or enhancer.

Illustrative examples of optional charge enhancing additives present in the toner in various effective amounts, such as for example from about 0.1 to about 20 percent, and preferably from about 1 to about 5 weight percent, include alkyl pyridinium halides, such as cetyl pyridinium chlorides, reference U.S. Pat. No. 4,298,672, the disclosure of which is totally incorporated herein by reference, cetyl pyridinium tetrafluoroborates, quaternary ammonium sulfate, and sulfonate charge control agents as illustrated in U.S. Pat. No. 4,338,390, the disclosure of which is totally incorporated herein by reference; stearyl phenethyl dimethyl ammonium tosylates, reference U.S. Pat. No. 4,338,390, the disclosure of which is totally incorporated herein by reference; distearyl dimethyl ammonium methyl sulfate, reference U.S. Pat. No. 4,560,635, the disclosure of which is totally incorporated herein by reference; stearyl dimethyl hydrogen ammonium tosylate; and other known similar charge enhancing additives; and the like. The fullerenes may also be selected as a charge additive for the toner compositions illustrated herein. In an embodiment, the aforementioned toners are comprised of resin particles, pigment particles comprised of carbon black, such as REGAL 330 ®, or fullerenes, and as charge additives fullerenes contained on surface additives such as colloidal silicas.

With further respect to the toner and developer compositions of the present invention, linear polymeric alcohol comprised of a fully saturated hydrocarbon backbone with at least about 80 percent of the polymeric chains terminated at one chain end with a hydroxyl group, which alcohol as represented by the following formula may also be included in the toner, or on the toner surface:

$$CH_3(CH_2)_nCH_2OH$$

wherein n is a number of from about 30 to about 300, and preferably of from about 30 to about 100, which alcohols are available from Petrolite Corporation. Particularly preferred polymeric alcohols include those wherein n represents a number of from about 30 to about 50. Therefore, in one embodiment of the present invention the polymeric alcohols selected have a number average molecular weight as determined by gas chromatography of from about greater than 450 to about 1,400, and preferably of from about 475 to about 750. In addition, the aforementioned polymeric alcohols are present in the toner and developer compositions illustrated herein in various effective amounts, and can be added as uniformly dispersed internal, or as finely divided uniformly dispersed external additives. More specifically, the polymeric alcohols can be present in an amount of from about 0.05 percent to about 20 percent by weight. Therefore, for example, as internal additives the polymeric alcohols are present in an amount of from about 0.5 percent by weight to about 20 percent by weight, while as external additives the polymeric alcohols are present in an amount of from about 0.05 percent by weight to slightly less than about 5 percent by weight. Toner and developer compositions with the waxes present internally are formulated by initially blending the toner resin particles, pigment particles, and polymeric alcohols, and other optional components. In contrast, when the polymeric alcohols are present as external additives, the toner composition is initially formulated comprised of, for example, resin particles and pigment particles; and subsequently there is added thereto finely divided polymeric alcohols. Surface additives, such as colloidal silicas, such as AEROSIL R972 ®, metal salts of fatty acids, metal oxides, and the like, in effective amounts of, for example, from about 0.1 to about 3 weight perent may be included on the toner surface.

Illustrative examples of carrier particles that can be selected for mixing with the toner compositions of the present invention include those particles that are capable of triboelectrically obtaining a charge of opposite polarity to that of the toner particles. Accordingly, the carrier particles of the present invention can be selected so as to be of a negative polarity, thereby enabling the toner particles which are positively charged to adhere to and surround the carrier particles. Alternatively, there can be selected carrier particles with a positive polarity enabling toner compositions with a negative polarity. Illustrative examples of carrier particles that may be selected include granular zircon, granular silicon, glass, steel, nickel, iron, ferrites, silicon dioxide, and the like. Additionally, there can be selected as carrier particles nickel berry carriers as disclosed in U.S. Pat. No. 3,847,604, which carriers are comprised of nodular carrier beads of nickel characterized by surfaces of reoccurring recesses and protrusions thereby providing particles with a relatively large external area. The carrier particles selected for the present invention can be comprised of a magnetic, such as steel, core with a polymeric coating thereover, several of which are illustrated, for example, in U.S. Ser. No. 751,922 (now abandoned) relating to developer compositions with certain carrier particles, the disclosure of which is totally incorporated herein by reference. More specifically, there are illustrated in the aforementioned application carrier particles comprised of a core with a coating thereover of vinyl polymers, or vinyl homopolymers. Examples of specific carriers illustrated in this abandoned application, and particularly useful for the present invention are those comprised of a steel or ferrite core with a coating thereover of a vinyl chloride/trifluorochloroethylene copolymer, which coating contains therein conductive particles, such as carbon black. Other known coatings include fluoropolymers, such as polyvinylidenefluoride resins, poly(chlorotrifluoroethylene), fluorinated ethylene and propylene copolymers, terpolymers of styrene, methylmethacrylate, and a silane, such as triethoxy silane, reference U.S. Pat. Nos. 3,467,634 and 3,526,533, the disclosures of which are totally incorporated herein by reference; polytetrafluoroethylene, fluorine containing polyacrylates, and polymethacrylates; copolymers of vinyl chloride; and trichlorofluoroethylene; and other known coatings. There can also be selected as carriers components comprised of a core with a double polymer coating thereover, reference U.S. Pat. Nos. 4,937,166 and 4,935,326, the disclosures of which are totally incorporated herein by reference. More specifically, there are illustrated in these patents carrier particles with a polymer mixture which can be prepared by (1) mixing carrier cores with a polymer mixture comprising from about 10 to about 90 percent by weight of a first polymer, and from about 90 to about 10 percent by weight of a second polymer; (2) dry mixing the carrier core particles and the polymer mixture for a sufficient period of time enabling the polymer mixture to adhere to the carrier core particles; (3) heating the mixture of carrier core particles and polymer mixture to a temperature of between about 200° F. and about 550° F. whereby the polymer mixture melts and fuses to the carrier core particles; and (4) thereafter cooling the resulting coated carrier particles.

Also, while the size of the carrier particles can vary, generally they are of a diameter of from about 50 microns to about 1,000 microns, and preferably in embodiments from about 50 to about 250 microns, thus allowing these particles to, for example, possess sufficient density and inertia to avoid adherence to the electrostatic images during the development process. The carrier particles can be mixed with the toner particles in various suitable combinations, such as about 1 to about 5 parts per toner to about 100 parts to about 200 parts by weight of carrier.

The toner compositions of the present invention can be prepared by a number of known methods, including mechanical blending and melt blending the toner resin particles, pigment particles or colorants, and other additives followed by mechanical attrition. Other methods include those well known in the art such as spray drying, mechanical dispersion, melt dispersion, dispersion polymerization, extrusion, and suspension polymerization. The toners can be subjected to known micronization, and classifications to provide toner particles with an average volume diameter of from about 9 to about 20, and preferably from about 10 to about 15 microns as determined by a Coulter Counter. Also, the toners can possess a toner triboelectric charge of from about a positive or negative 10 to about 50, and in embodiments from about 15 to about 30 microcoulombs per gram as determined by the known Faraday Cage method. The triboelectric charge can depend on a number of known factors, such as the toner components, the carrier components, including the carrier coating, the coating weight, and the like.

The toner and developer compositions of the present invention may be selected for use in developing images in electrostatographic imaging and systems, containing therein, for example, conventional photoreceptors, such as selenium and selenium alloys. Also useful, especially wherein there are selected positively charged toner compositions, are layered photoresponsive devices comprised of transport layers and photogenerating layers, reference U.S. Pat. Nos. 4,265,990; 4,585,884; 4,584,253 and 4,563,408, the disclosures of which are totally incorporated herein by reference, and other similar layered photoresponsive devices. Examples of photogenerating layers include selenium, selenium alloys, trigonal selenium, metal; phthalocyanines, metal free phthalocyanines, titanyl phthalocyanines, and vanadyl phthalocyanines, while examples of charge transport layers include the aryl amines as disclosed in U.S. Pat. No. 4,265,990. Moreover, there can be selected as photoconductors hydrogenated amorphous silicon; and as photogenerating pigments squaraines, perylenes; and the like.

Moreover, the toner and developer compositions of the present invention are particularly useful with electrostatographic imaging apparatuses containing a development zone situated between a charge transporting means and a metering charging means, which apparatus is illustrated in U.S. Pat. Nos. 4,394,429 and 4,368,970. More specifically, there is illustrated in the aforementioned '429 patent a self-agitated, two-component, insulative development process and apparatus wherein toner is made continuously available immediately adjacent to a flexible deflected imaging surface, and toner particles transfer from one layer of carrier particles to another layer of carrier particles in a development zone. In one embodiment, this is accomplished by bringing a transporting member, such as a development roller, and a tensioned deflected flexible imaging member into close proximity, that is a distance of from about 0.05 millimeter to about 1.5 millimeters, and preferably from about 0.4 millimeter to about 1.0 millimeter in the present of a high electric field, and causing such members to move at relative speeds. There is illustrated in the aforementioned '970 patent an electrostatographic imaging apparatus comprised of an imaging means, a charging means, an exposure means, a development means, and a fixing means, the improvement residing in the development means comprising in operative relationship a tensioned deflected flexible imaging means; a transporting means; a development zone situated between the imaging means and the transporting means; the development zone containing therein electrically insulating magnetic carrier particles, means for causing the flexible imaging means to move at a speed of from about 5 centimeters/second to about 50 centimeters/second, means for causing the transporting means to move at a speed of from about 6 centimeters/second to about 100 centimeters/second, the means for imaging and the means for transporting moving at different speeds; and the means for imaging and the means for transporting having a distance therebetween of from about 0.05 millimeter to about 1.5 millimeters.

The following examples are being provided. Also, parts and percentages are by weight unless otherwise indicated.

EXAMPLE I

There is prepared by melt blending, followed by mechanical attrition, and classification a toner composition with an average volume particle diameter of about 11 microns comprised of 91 percent by weight of a styrene butadiene resin with 91 percent by weight of styrene and 9 percent by weight of butadiene, and 9 percent by weight of a fullerene $C_{60}$ as obtained from Texas Fullerene Corporation. Subsequently, there can be prepared a developer composition by admixing the aforementioned formulated toner composition at a 4.5 percent toner concentration, that is 4.5 parts by weight of toner per 100 parts by weight of carrier, which carrier can be comprised of a steel core with a coating, 0.8 percent coating weight, thereover of a vinyl chloride trichlorofluoroethylene copolymer with conductive VULCAN ® carbon black particles, 20 weight percent, dispersed therein.

Thereafter, the formulated developer composition can be incorporated into an electrostatographic imaging device with a toner transporting means, a toner metering charging means, and a development zone as illustrated in U.S. Pat. No. 4,394,429, the disclosure of which is totally incorporated herein by reference; and wherein the imaging member is comprised of an aluminum supporting substrate, a photogenerating layer of trigonal selenium, and a charge transport layer thereover of the aryl amine N,N'-diphenyl-N,N'-bis(3-methylphenyl) 1,1'-biphenyl-4,4'-diamine, 50 percent by weight, dispersed in 50 percent by weight of the polycarbonate resin available as MAKROLON ®, reference U.S. Pat. No. 4,265,990, the disclosure of which is totally incorporated herein by reference. Images of excellent resolution may be obtained.

EXAMPLE II

A toner and developer composition can be prepared by repeating the procedure of Example I with the exception that there are selected 7 percent by weight of the fullerene, and 2 weight percent of REGAL330 ® carbon black.

The prepared developer composition can then be incorporated into the same electrostatographic imaging device of Example I, and there can result images, it is believed, of excellent quality, for example, with no background deposits.

EXAMPLE III

A toner and developer composition is prepared by repeating the procedure of Example I with the exception that there is selected as the pigment in place of the fullerene, REGAL 330 ® carbon black, 6 weight percent, and as a charge additive the fullerene of Example I, 3 percent by weight.

EXAMPLE IV

A reddish brown toner can be prepared by repeating the procedure of Example I with the exception that about 3 weight percent of the fullerene $C_{70}$ and 97 weight percent of the styrene resin are selected.

EXAMPLE V

A yellow toner can be prepared by repeating the procedure of Example I with the exception that about 2 weight percent of the fullerene $C_{60}$ and 98 weight percent of the styrene resin are selected.

EXAMPLE VI

A red toner can be prepared by repeating the procedure of Example I with the exception that about 2 weight percent of the fullerene $C_{60}$, 3 weight percent of LITHOL SCARLETT ™ and 95 weight percent of the styrene resin are selected.

EXAMPLE VII

A red toner can be prepared by repeating the procedure of Example I with the exception that about 2 weight percent of the fullerene $C_{60}$, 3 weight percent of LITHOL SCARLETT ™ and 95 weight percent of the styrene resin are selected.

EXAMPLE VIII

There was prepared by suspension polymerization, followed by mechanical attrition, and classification a white toner composition, with a weight average particle diameter of about 8 microns, comprised of 100 percent by weight of a styrene butadiene resin with 91 percent by weight of styrene and 9 percent by weight of butadiene, and subsequently adding to the toner surface 0.44 weight percent of the fullerene, $C_{60}$ as obtained from Texas Fullerene Corporation. Subsequently, there was prepared a developer composition by admixing the aforementioned formulated toner composition at a 1.62 percent toner concentration, that is 1.62 parts by weight of toner per 100 parts by weight of carrier, which carrier was comprised of a steel core with a polymer coating mixture, 0.7 percent coating weight, thereover of 50 weight percent of KYNAR ®, and 50 weight percent of polymethylmethacrylate, reference U.S. Pat. No. 4,937,166, the disclosure of which is totally incorporated herein by reference. The toner had a triboelectric charge of a negative (−) 49.6 microcoulombs per gram, at 1.62 toner concentration, as determined by the known Faraday Cage method. Substantially similar imaging results as in Example I were obtained.

EXAMPLE IX

There was prepared by suspension polymerization, followed by mechanical attrition, and classification a white toner composition with a weight average particle diameter of about 8 microns comprised of 100 percent by weight of a styrene butadiene resin with 91 percent by weight of styrene and 9 percent by weight of butadiene, and subsequently adding to the toner surface 0.44 weight percent of the fullerence $C_{60}$ as obtained from Texas Fullerene Corporation. Subsequently, there was prepared a developer composition by admixing the aforementioned formulated toner composition at a 0.7 percent toner concentration, that is 1.54 parts by weight of toner per 100 parts by weight of carrier, which carrier was comprised of a steel core with a polymer coating mixture, 0.7 percent coating weight, thereover of 70 weight percent of KYNAR ®, and 30 weight percent of polymethylmethacrylate, reference U.S. Pat. No. 4,937,166, the disclosure of which is totally incorporated herein by reference. The toner had a triboelectric charge of a negative (−) 27.3 microcoulombs per gram, at 1.54 toner concentration, as determined by the known Faraday Cage method. Substantially similar imaging results as in Example I were obtained.

EXAMPLE X

There was prepared by suspension polymerization, followed by mechanical attrition, and classification a white toner composition with a weight average particle diameter of about 8 microns comprised of 100 percent by weight of a styrene butadiene resin with 91 percent by weight of styrene and 9 percent by weight of butadiene, and subsequently adding to the toner surface 0.44 weight percent of the fullerence $C_{60}$ as obtained from Texas Fullerene Corporation. Subsequently, there was prepared a developer composition by admixing the aforementioned formulated toner composition at a 0.7 percent toner concentration, that is 1.40 parts by weight of toner per 100 parts by weight of carrier, which carrier was comprised of a steel core with a polymer coating mixture, 0.7 percent coating weight, thereover of 90 weight percent of KYNAR ®, and 10 weight percent of polymethylmethacrylate, reference U.S. Pat. No. 4,937,166, the disclosure of which is totally incorporated herein by reference. The toner has a triboelectric charge of a negative (−) 2.6 microcoulombs per gram at 1.40 toner concentration, as determined by the known Faraday Cage method. Substantially similar imaging results as in Example I were obtained.

Thereafter, the formulated developer composition can be incorporated into an electrostatographic imaging device with a toner transporting means, a toner metering charging means, and a development zone as illustrated in U.S. Pat. No. 4,394,429, the disclosure of which is totally incorporated herein by reference, and wherein the imaging member is comprised of an aluminum supporting substrate, a photogenerating layer of trigonal selenium, and a charge transport layer thereover of the aryl amine N,N'-diphenyl-N,N'-bis(3-methylphenyl) 1,1'-biphenyl-4,4'-diamine, 50 percent by weight, dispersed in 50 percent by weight of the polycarbonate resin available as MAKROLON®, reference U.S. Pat. No. 4,265,990, the disclosure of which is totally incorporated herein by reference. Images of excellent resolution can be obtained.

Other toner and developer compositions can be prepared by repeating the processes as recited in the above Examples, and as illustrated herein with the exception that there may be selected fullerenes, such as $C_{70}$, $C_{234}$, $C_{340}$, polymeric fullerenes, and other known fullerenes.

Other modifications of the present invention may occur to those skilled in the art subsequent to a review of the present application. The aforementioned modifications, including equivalents thereof, are intended to be included within the scope of the present invention.

What is claimed is:

1. A toner composition comprised of resin particles and pigment particles comprised of a fullerene or fullerenes wherein the fullerene or fullerenes are comprised of $C_{60}$ carbon, $C_{70}$ carbon, $C_{84}$ carbon, $C_{234}$ carbon, $C_{340}$ carbon, or mixtures thereof.

2. A toner composition in accordance with claim 1 containing a charge enhancing additive.

3. A toner composition in accordance with claim 2 wherein the charge enhancing additive is selected from the group consisting of distearyl dimethyl ammonium methyl sulfate, cetyl pyridinium halides, and stearyl phenethyl dimethyl ammonium tosylate.

4. A developer composition comprised of the toner of claim 1, and carrier particles.

5. A developer composition in accordance with claim 4 wherein the carrier particles are comprised of a core with a polymeric coating thereover.

6. A developer composition in accordance with claim 4 wherein the carrier particles are comprised of a steel or a ferrite core with a coating thereover selected from the group consisting of polychlorotrifluoroethylene-co-vinylchloride copolymer, a polyvinylidene fluoropolymer, a terpolymer of styrene, methacrylate, and an organo silane, fluorinated ethylene-propylene copolymers, and polytetrafluoroethylene.

7. A method for obtaining images which comprises generating an electrostatic latent image on a photoconductive imaging member, subsequently affecting development of this image with the toner composition of claim 1, thereafter transferring the image to a permanent substrate, and optionally permanently affixing the image thereto.

8. A toner in accordance with claim 1 wherein the fullerene is comprised of alkyl fullerenes, wherein alkyl contains from 1 to about 25 carbon atoms, or aryl fullerenes, wherein aryl contains from 6 to about 24 carbon atoms.

9. A toner composition comprised of resin and pigment consisting essential of a fullerene or fullerenes wherein the fullerene or fullerenes are comprised of $C_{60}$ carbon, $C_{70}$ carbon, $C_{84}$ carbon, $C_{234}$ carbon, $C_{340}$ carbon, or mixtures thereof.

10. A toner composition in accordance with claim 9 wherein the fullerenes are comprised of $C_{60}$ carbon in the configuration of a soccer ball.

11. A toner composition in accordance with claim 9 wherein the resin is comprised of a styrene methacrylate, a polyester, a styrene butadiene, or a styrene acrylate.

12. A toner composition in accordance with claim 11 wherein the polyester results from the condensation reaction of dimethylterephthalate, 1,2-propanediol, 1,3-butanediol, and pentaerythritol; or wherein the polyester results from the condensation reaction of dimethylterephthalate, 1,2-propanediol, diethylene glycol, and pentaerythritol.

13. A toner composition in accordance with claim 11 wherein the styrene butadiene copolymer contains 91 percent by weight of styrene, and 9 percent by weight of butadiene.

14. A toner composition in accordance with claim 9 wherein there is selected a suspension polymerized styrene butadiene resin.

15. A developer composition comprised of the toner of claim 9, and carrier particles.

16. A developer composition in accordance with claim 15 wherein the carrier particles are comprised of a core with a polymeric coating thereover.

17. A method of obtaining images which comprises generating an electrostatic latent image on a photoconductive imaging member, subsequently affecting development of this image with the toner composition of claim 9, thereafter transferring the image to a permanent substrate, and optionally permanently affixing the image thereto.

18. A toner in accordance with claim 9 wherein the fullerene is of a molecular weight of from about 384 to about 12,000.

* * * * *

Adverse Decisions In Interference

Patent No. 5,188,918, Ronald F. Ziolo, TONER AND DEVELOPER COMPOSITIONS COMPRISING FULLERENE, Interference No. 103,281, final judgment adverse to the patentees rendered September 23, 1999, as to claims 1 through 20.

*(Official Gazette July 4, 2000)*